(12) United States Patent
Wong et al.

(10) Patent No.: US 9,131,428 B2
(45) Date of Patent: Sep. 8, 2015

(54) PROBE REQUEST FOR RELAY DISCOVERY WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Chiu Ngok Eric Wong, San Jose, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 74 days.

(21) Appl. No.: 13/958,784

(22) Filed: Aug. 5, 2013

(65) Prior Publication Data

US 2014/0119272 A1 May 1, 2014

Related U.S. Application Data

(60) Provisional application No. 61/720,770, filed on Oct. 31, 2012, provisional application No. 61/766,795, filed on Feb. 20, 2013, provisional application No. 61/814,945, filed on Apr. 23, 2013, provisional application No. 61/819,238, filed on May 3, 2013, provisional application No. 61/822,504, filed on May 13, 2013, provisional application No. 61/822,510, filed on May 13, 2013, provisional application No. 61/858,737, filed on Jul. 26, 2013.

(51) Int. Cl.
| | |
|---|---|
| *H04Q 11/00* | (2006.01) |
| *H04W 40/04* | (2009.01) |
| *H04W 40/24* | (2009.01) |
| *H04W 40/12* | (2009.01) |

(52) U.S. Cl.
CPC ............ *H04W 40/04* (2013.01); *H04W 40/246* (2013.01); *H04W 40/12* (2013.01)

(58) Field of Classification Search
CPC .... H04W 40/04; H04W 40/246; H04W 40/12
USPC .................. 370/274, 293, 315–327, 492, 501
See application file for complete search history.

(56) References Cited

U.S. PATENT DOCUMENTS

| | | | | |
|---|---|---|---|---|
| 2004/0205105 | A1* | 10/2004 | Larsson et al. ................. | 709/200 |
| 2007/0201392 | A1* | 8/2007 | Ramachandran ............. | 370/315 |
| 2008/0025282 | A1* | 1/2008 | Hong ............................ | 370/342 |
| 2008/0144552 | A1* | 6/2008 | Johansson et al. ............ | 370/310 |
| 2009/0003261 | A1* | 1/2009 | Kim .............................. | 370/315 |
| 2010/0008221 | A1* | 1/2010 | Hong et al. ................... | 370/226 |

(Continued)

*Primary Examiner* — Mark Rinehart
*Assistant Examiner* — Mang Yeung
(74) *Attorney, Agent, or Firm* — Garlick & Markison; Shayne X. Short

(57) ABSTRACT

A relay wireless communication device is discovered using probe request. A source device that intends to transmit one or more frames to a destination device transmits the probe request to request a probe response from one or more potential relay devices. A relay device transmits a probe response to the source device when the relay device may operate to forward the one or more frames from the source device to the destination device. The relay device employs one or more considerations to determine its eligibility to serve as relay for the source and destination devices. The source device selects one of the potential relay devices based on their provided probe responses. The source device may select an optimal relay device based upon two or more received probe responses.

20 Claims, 7 Drawing Sheets

(56) References Cited

U.S. PATENT DOCUMENTS

| | | | |
|---|---|---|---|
| 2010/0054173 A1* | 3/2010 | Kim et al. | 370/315 |
| 2013/0188542 A1* | 7/2013 | Merlin et al. | 370/311 |
| 2013/0294331 A1* | 11/2013 | Wang et al. | 370/315 |
| 2013/0336196 A1* | 12/2013 | Abraham et al. | 370/315 |

* cited by examiner

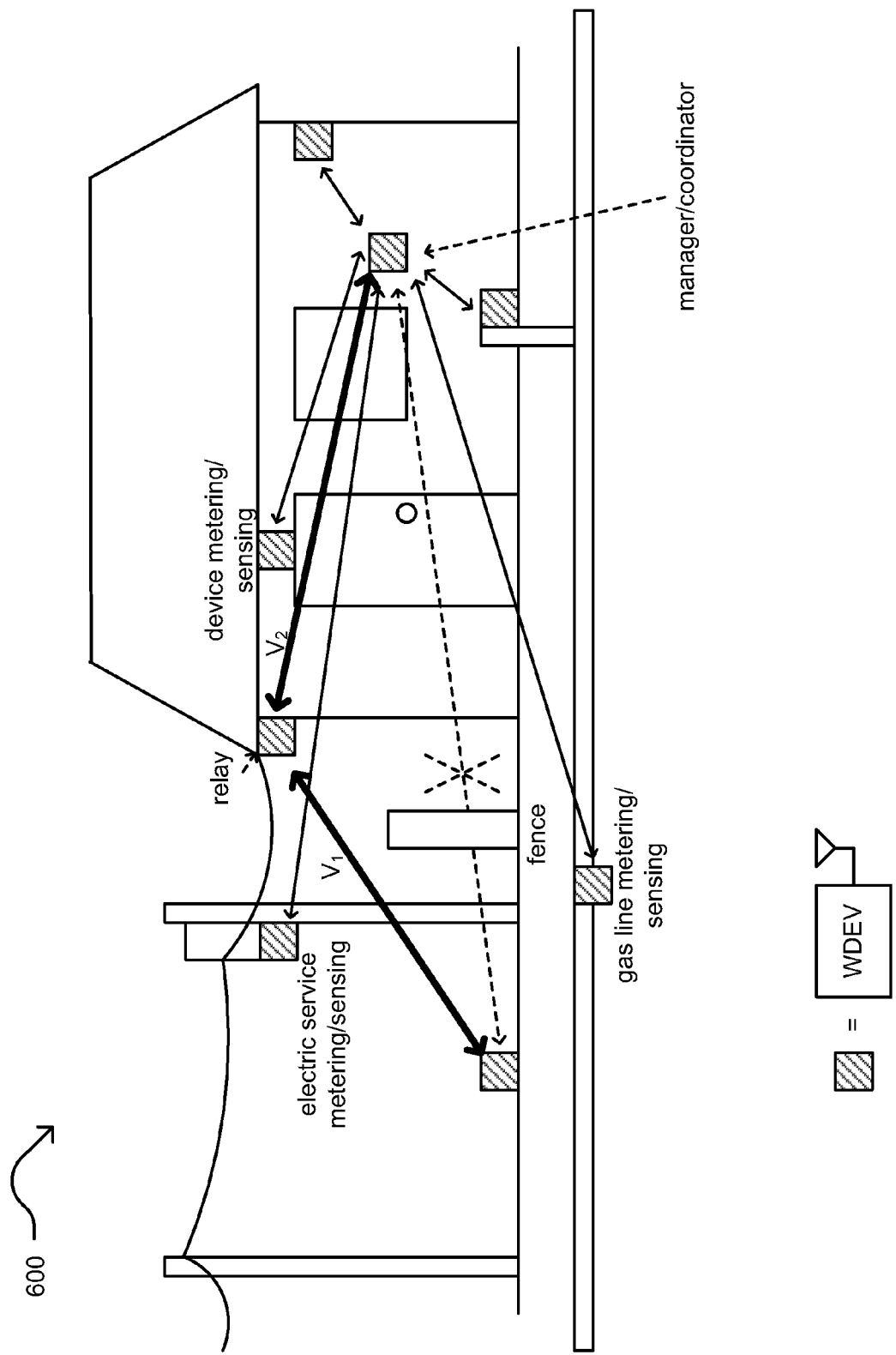

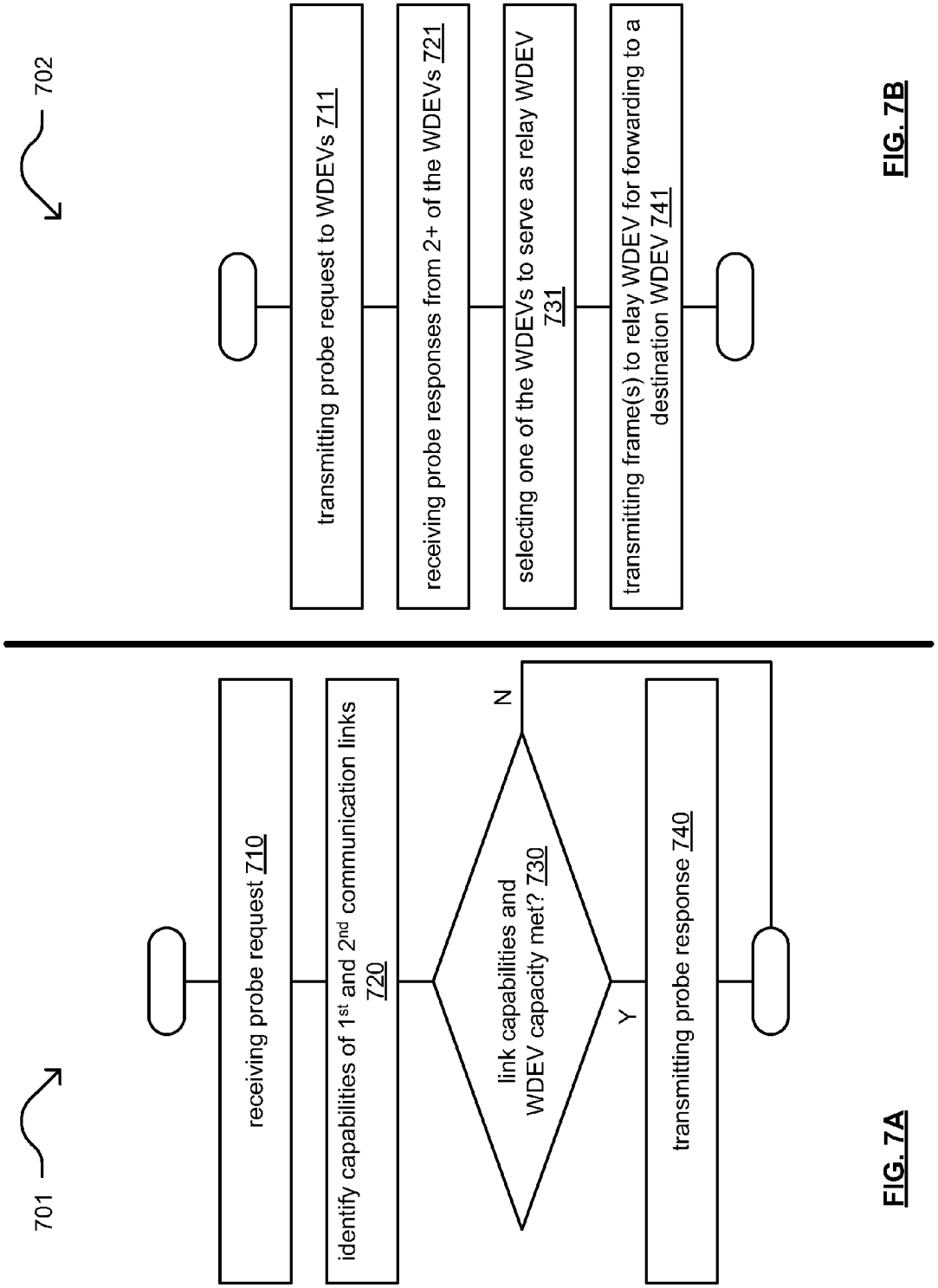

PROBE REQUEST FOR RELAY DISCOVERY WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:

1. U.S. Prov. Patent App. Ser. No. 61/720,770, entitled "Relay within single user, multiple user, multiple access, and/or MIMO wireless communications," filed Oct. 31, 2012.

2. U.S. Prov. Patent App. Ser. No. 61/766,795, entitled "Relay within single user, multiple user, multiple access, and/or MIMO wireless communications," filed Feb. 20, 2013.

3. U.S. Prov. Patent App. Ser. No. 61/814,945, entitled "Relay within single user, multiple user, multiple access, and/or MIMO wireless communications," filed Apr. 23, 2013.

4. U.S. Prov. Patent App. Ser. No. 61/819,238, entitled "Relay within single user, multiple user, multiple access, and/or MIMO wireless communications," filed May 3, 2013.

5. U.S. Prov. Patent App. Ser. No. 61/822,504, entitled "Relay within single user, multiple user, multiple access, and/or MIMO wireless communications," filed May 13, 2013.

6. U.S. Prov. Patent App. Ser. No. 61/822,510, entitled "Buffer relay management within single user, multiple user, multiple access, and/or MIMO wireless communications," filed May 13, 2013.

7. U.S. Prov. Patent App. Ser. No. 61/858,737, entitled "Probe request for relay discovery within single user, multiple user, multiple access, and/or MIMO wireless communications," filed Jul. 26, 2013.

BACKGROUND

1. Technical Field

The present disclosure relates generally to communication systems; and, more particularly, to relaying and relay device discovery within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Another type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Within such wireless communication systems, large distances between devices may cause problems and degrade communication performance. For example, fading and other undesired effects might reduce performance and the efficacy of communication between devices as the distance between them increases.

BRIEF DESCRIPTION OF THE SEVERAL VIEWS OF THE DRAWINGS

FIG. 6 is a diagram illustrating an embodiment of a number of wireless communication devices, some operative as smart meter stations (SMSTAs).

FIG. 7A is a diagram illustrating an embodiment of a method for execution by one or more wireless communication devices.

FIG. 7B is a diagram illustrating another embodiment of a method for execution by one or more wireless communication devices.

DETAILED DESCRIPTION

Figure 1:
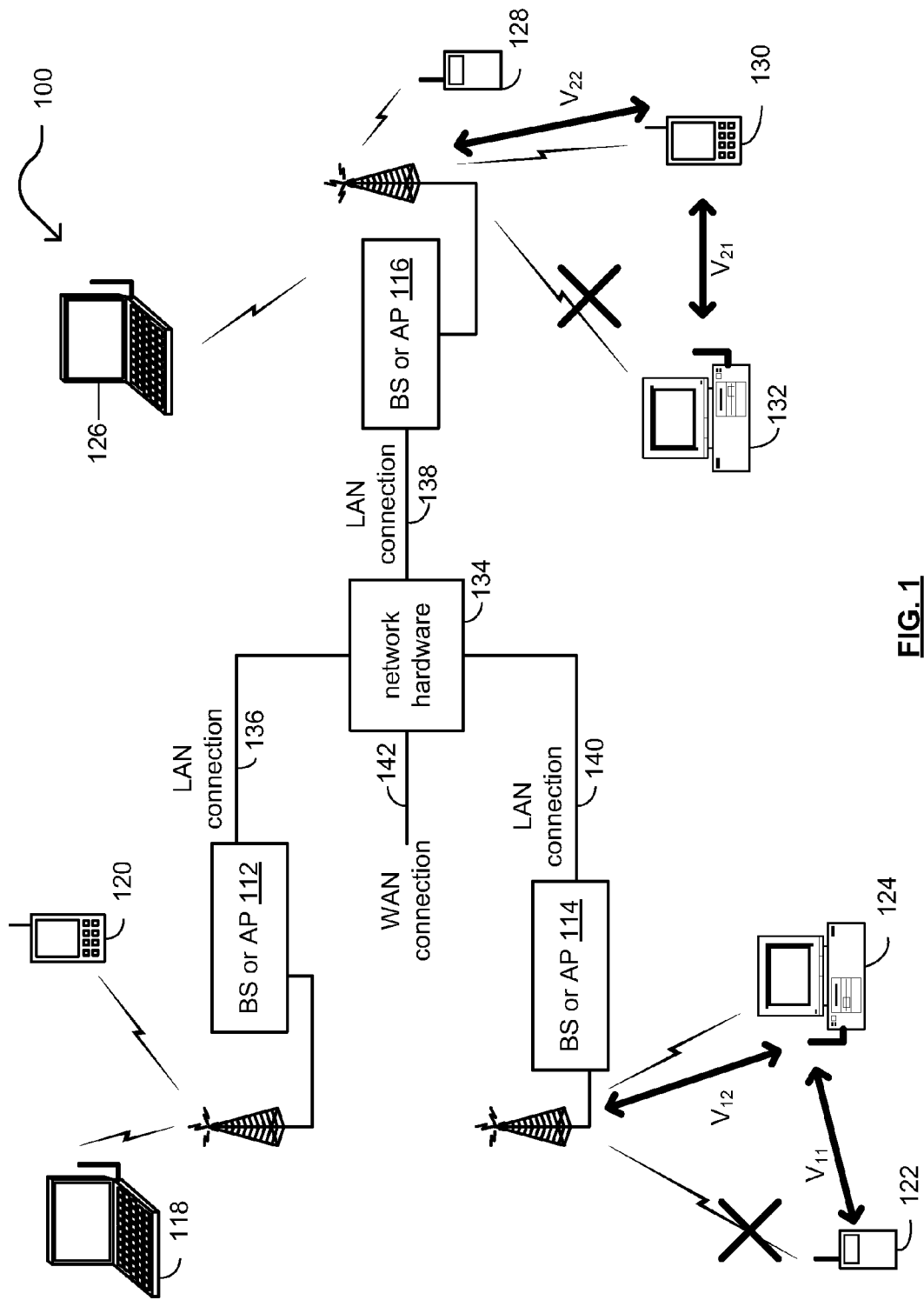
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., devices that include wireless stations (STAs), stand-alone wireless stations, and/or smart meter stations (SMSTAs)), and a network hardware component 134. The wireless communication devices 118-132 may be laptop computers, or tablets, 118 and 126, personal digital assistant 120 and 130, personal computer 124 and 132 and/or cellular telephone 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-114 to receive services from the communication system 100. For direct connections (i.e., point-to-point communications), wireless communication devices communicate directly via an allocated channel.

For various reasons, communication between the various devices (BSs/APs or STAs) may be adversely affected due to fading, distance, interference, weak/inefficient communication link, etc. and/or other impairments. Also, the performance level of a communication link between two devices may be possible to at least some degree yet not be acceptable for certain purposes (e.g., unable to support acceptable throughput for video). In such situations, any one of the devices 118-132 and 112-116 may serve as a relay for communications between two other of the devices 118-132 and 112-116. Considering an example of operation, cellular telephone 122 may be unable to support communications with BS/AP 114. In such an instance, personal computer (PC) 124 can serve to support communications between cellular telephone 122 and BS/AP 114. The relaying may be in either direction such that either PC 124 or BS/AP 114 operates as a source wireless communication device, and the cellular telephone 122 operates as a destination wireless communication device, or vice versa. In one example of operation, PC 124 may receive a frame from the cellular telephone 122 (hop $V_{11}$), and the PC 124 operates as a relay to generate and transmit a relayed frame to the BS/AP 114 (hop $V_{12}$.). The relaying may alternatively be performed in the opposite direction.

Considering an example of operation, PC 132 may be unable to support communications with BS/AP 116. In such an instance, personal digital assistant (PDA) 130 can serve to support communications between PC 132 and BS/AP 116. In one example of operation, PA 132 may receive a frame from the PC 132 (hop $V_{21}$), and the PDA 130 operates as a relay to generate and transmit a relayed frame to the BS/AP 116 (hop $V_{22}$.). The relaying may alternatively be performed in the opposite direction.

Note that for brevity, source, relay, and destination (or source device, relay device, and destination device, or other such equivalents) may be used herein instead of source wireless communication device, relay wireless communication device, and destination wireless communication device. Generally, a wireless communication device (or device) may operate as a relay between two other wireless communication devices (or devices).

A relay device may receive the probe request from a source device. The probe request includes a link budget requirement to support communications between the source device and the destination device. Such link budget information may correspond to various parameters including acceptable throughput, symbol rate, bit rate, signal to noise ratio (SNR), interference, noise, etc. and/or any other information that may characterize a communication link. The relay device identifies first capabilities of a first communication link between the relay device and the source device and second capabilities of a second communication link between the relay device and the destination device. When the first and second capabilities meet or exceed the link budget requirement specified in the probe request, and when the relay device has capacity to support communications between the source and destination devices, the relay device generates and transmits a probe response to the source device to indicate the relay device's eligibility to serve as a relay for the communications between the source and destination devices.

Figure 2:
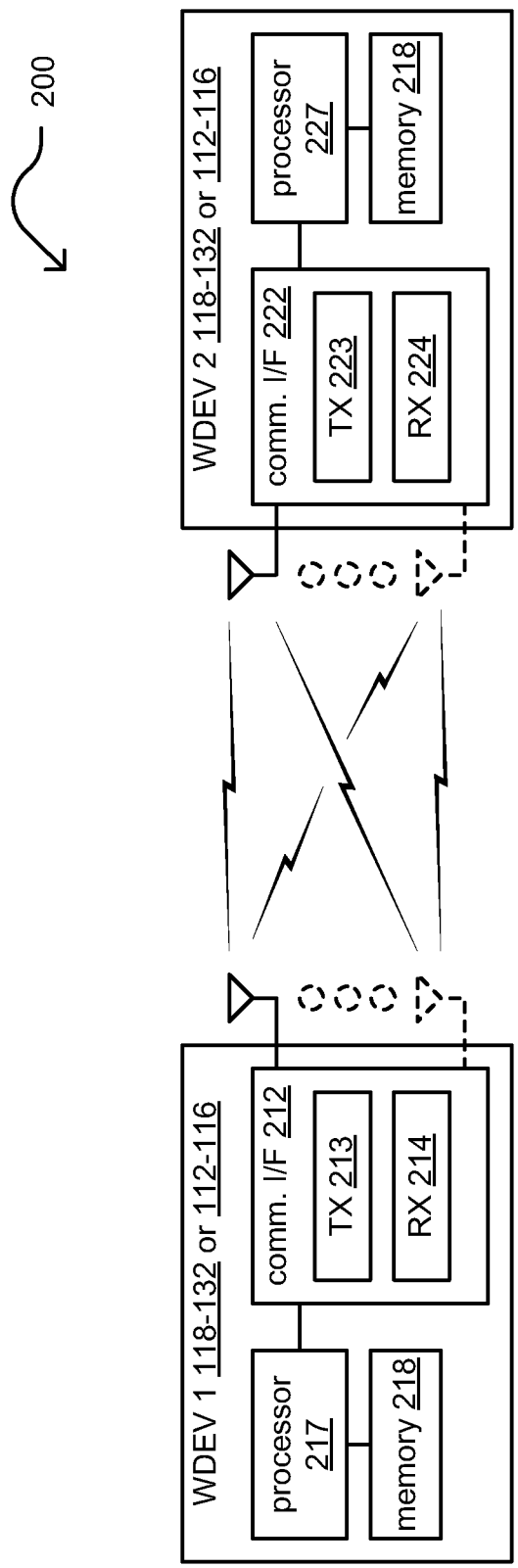
FIG. 2 is a diagram illustrating an example of wireless communication devices

FIG. 2 is a diagram illustrating an example 200 of wireless communication devices. Generally, the acronym WDEV in the diagrams is used to identify a wireless communication device. A wireless communication device 1 (e.g., which may be any one of devices 118-132 or any one of devices 112-116 as with reference to FIG. 1) is in communication with another wireless communication device 2 (e.g., which also may be any other one of devices 118-132 or any other one of devices 112-116 as with reference to FIG. 1). The wireless communication device 1 includes a communication interface 212 to perform transmitting and receiving of one or more frames (e.g., using a transmitter 213 and a receiver 214). The wireless communication device 1 also includes a processor 217, and an associated memory 218, to execute various operations including interpreting one or more frames transmitted to and/or received from the wireless communication device 2. The wireless communication device 2 similarly includes a communication interface 222 (e.g., including a transmitter 223 and a receiver 224) as well as a processor 227 accompanied by memory 218.

As one of average skill in the art will appreciate, the wireless communication devices 1 and 2 of FIG. 2 may be implemented using one or more integrated circuits in accordance with any desired configuration or combination or components, modules, etc. within one or more integrated circuits. Either of the wireless communication devices 1 and 2 may also include more than one antenna to transmit and receive signals based on at least one of multiple-input and multiple-output signaling (e.g., based on SIMO, MISO, or MIMO signaling). In an example of operation, the wireless communication device 1 may serve as relay between the wireless communication device 2 and another wireless communication device. Alternatively, the wireless communication device 2 may serve as relay between the wireless communication device 1 and another wireless communication device.

Figure 3:
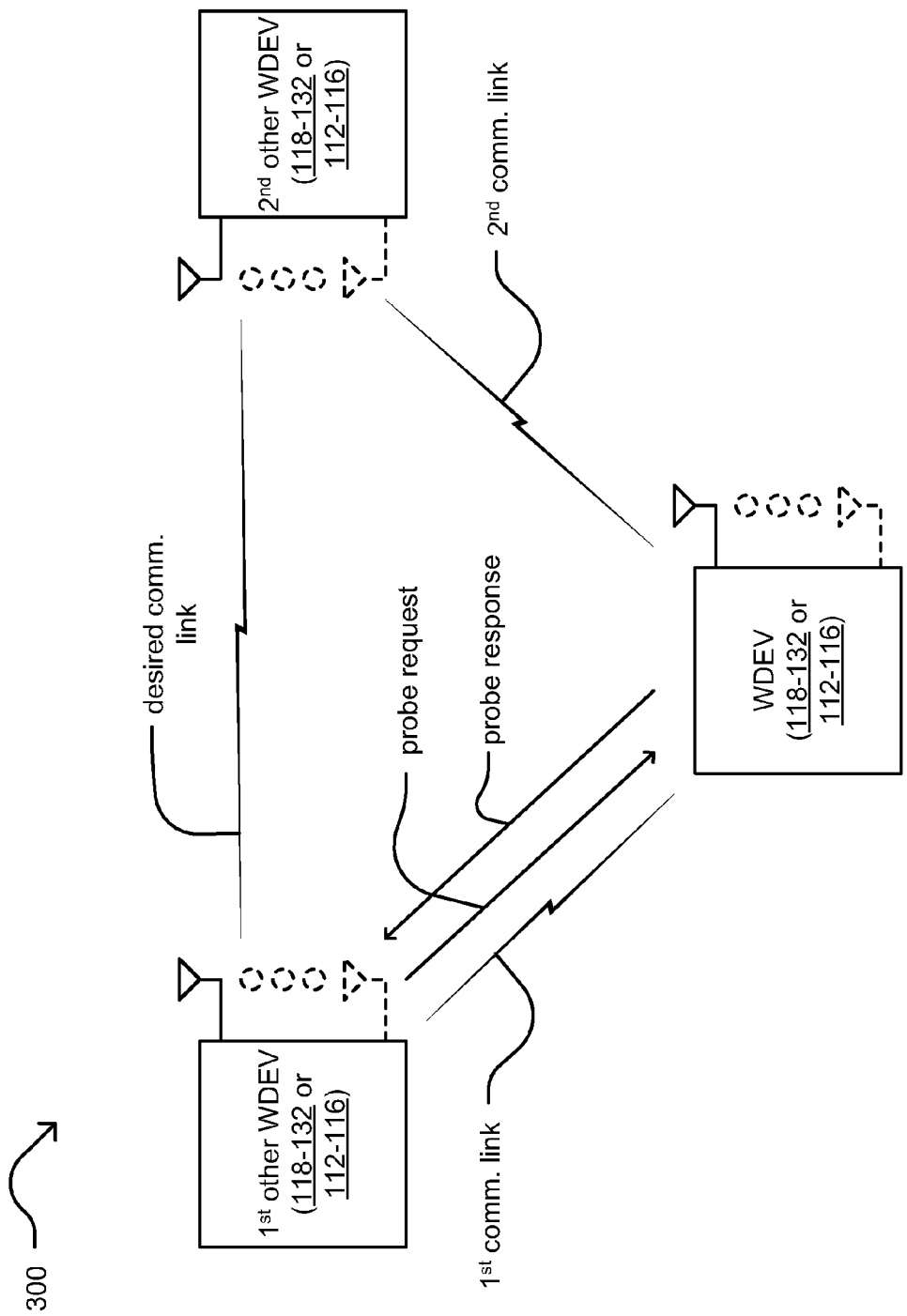
FIG. 3 is a diagram illustrating an example of communication between wireless communication devices using a relay wireless communication device.

FIG. 3 is a diagram illustrating an example 300 of communication between wireless communication devices using a relay wireless communication device. Generally, a wireless communication device shown at the bottom portion of the diagram operates as a relay for communications between a first other wireless communication device shown at the upper left of the diagram and a second other wireless communication device shown in the upper right of the diagram. Any of these three devices may be implemented as anyone of the any one of the devices 118-132 and 112-116 as described with reference to FIG. 1.

For any of a number of reasons, a desired communication link between the first other device and the second other device may not be achieved or cannot acceptably support the desired communications between those devices. For example, the first and second other devices may be out of range of one another. In another example, the second other device may be an access point (AP) whose service coverage area does not extend to the first other device.

The device shown at the bottom of the diagram (i.e., the relay device) receives a probe request from the first other device. The first other device intends to support communications with a second other device. The relay device identifies first capabilities of a first communication link with the first other device and second capabilities of the second communication link with the second other device. In one example of operation, the relay device may receive information regarding such first and second capabilities respectively from the first other device and the second other device. In another example of operation, the relay device may identify such first and second capabilities based on prior communications with the first and second other devices. Such determination of the first and second capabilities could be based on signal to noise ratio (SNR) associated with prior communications, amount of errors detected and/or corrected, amount of re-transmissions (if any) made or required, bit or symbol rate supported, etc. and/or any other information associated with the prior communications. In another example of operation, the relay device may transmit one or more sounding frames to the first and second other devices and then receive channel estimation or characterization information from the first and second other devices. In another example of operation, the relay device may receive one or more sounding frames from the first and second other devices and then process those one or more sounding frames to perform channel estimation for the first and second communication links. Generally, the relay device may identify such first and second capabilities using any of a number of means.

The relay device determines its eligibility to serve as a relay for communications between the first and second other devices based on the first and second capabilities of the first and second communication links as well as the relay device's capacity to serve as the relay. In some situations, the first and second capabilities of the first and second communication links may acceptably meet or exceed the link budget requirement specified within the probe request, but the relay device may not have the capacity to serve as the relay. For example, the relay device may be busy performing other tasks or supporting other communications. The relay device may determine its capacity to serve as the relay based on any of a number of considerations including the relay device's currently available processing resources, historical processing history, currently ongoing communications, historical communication history, and prior relay service.

In an example of operation, the relay device may consider information stored within a memory within the relay device (e.g., historical processing history, historical communication history, and prior relay service) as well as the current operational status of the relay device (e.g., its current processing operations and its currently supported communications). In addition, other characteristics of the relay device may be used to determine its eligibility to serve as a relay. For example, the relay device may be a battery-powered device or a wall- or power-line-powered device. Relaying may be preferably performed by wall- or power-line-powered device than by a battery-powered device. As such, when the relay device is a battery-powered device, it may determine that it does not have capacity to serve as a relay for the communications between the first and second other devices even when the first and second capabilities of the first and second communication links acceptably meet the link budget requirement specified within the probe request. When the relay device determines that it does not have capacity to serve as the relay, it does not provide any probe response to the first other device. However, when the relay device determines that it does have capacity to serve as the relay for communications between the first and second other devices, and when the first and second communication links acceptably meet or exceed the link budget requirement specified within the probe request, the relay device generates and transmits a probe response to the first other device.

Figure 4:
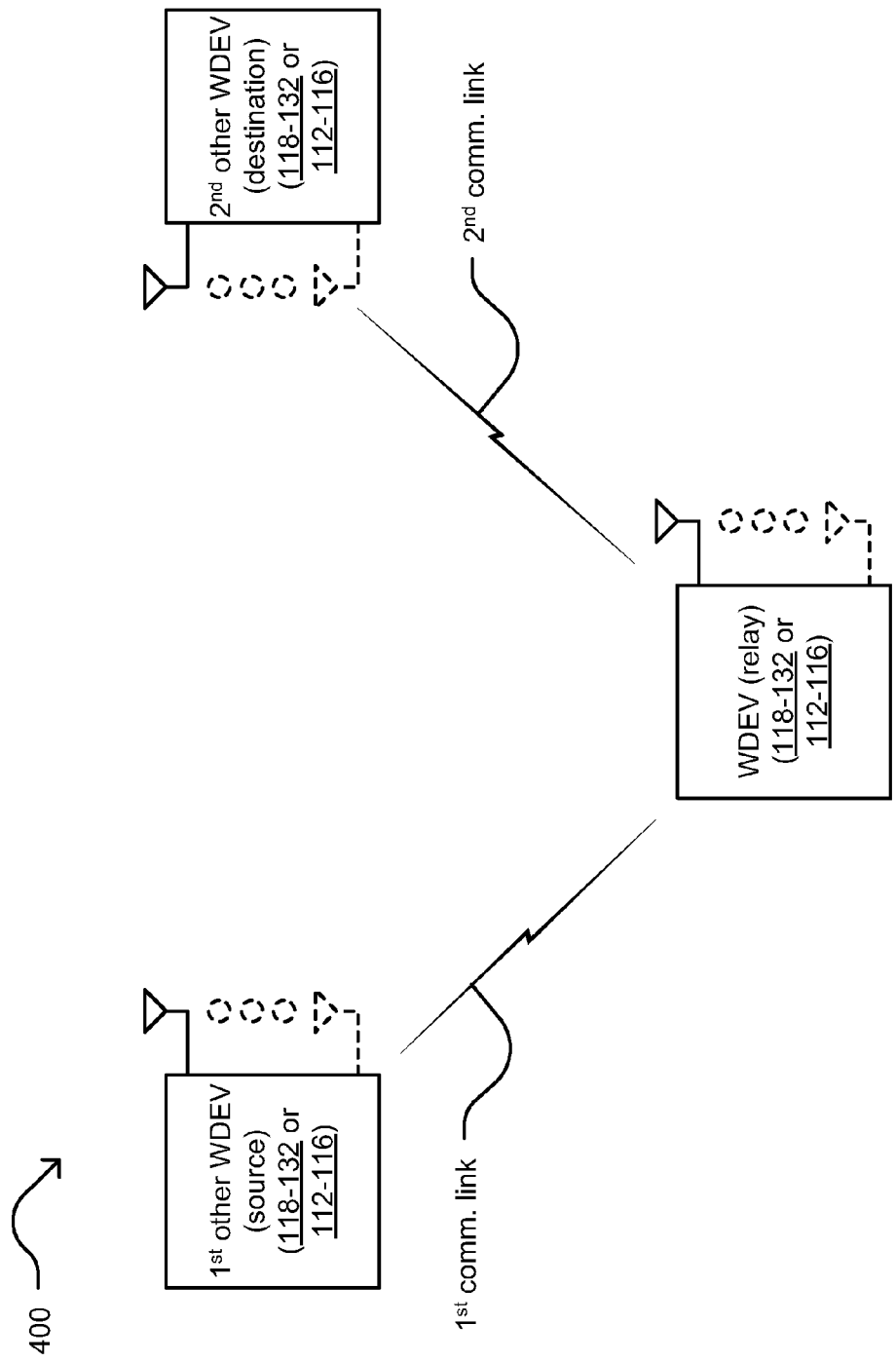
FIG. 4 is a diagram illustrating another example of communication between wireless communication devices via a relay wireless communication device.

FIG. 4 is a diagram illustrating another example 400 of communication between wireless communication devices via a relay wireless communication device. As with FIG. 3, in this diagram, the wireless communication device shown at the bottom portion of the diagram operates as a relay for communications between a first other wireless communication device shown at the upper left of the diagram and a second other wireless communication device shown in the upper right of the diagram. Any of these three devices may be implemented as anyone of the any one of the devices 118-132 and 112-116 as described with reference to FIG. 1.

In one example of operation, the first other device receives the probe response from the relay device that indicates the relay device's eligibility to serve as a relay for communications between the first and second other devices. The first other device may receive more than one probe response from more than one potential relay device. The first of the devices then selects one probe responding device to serve as the relay device and transmits a relay selection signal that indicates which one of the potential relay devices has been selected to serve as the relay. In another example of operation, the second other device operates to select one probe responding device to serve as the relay device. Upon being selected as the relay device based on the relay selection signal, the relay device facilitates the communications between the first and second other communication devices via the first and second communication links. Note also that different communication via the first and second communication links may be differently supported. For example, a first communication via the first communication link may be based on a first modulation coding set (MCS), and a second communication via the second communication link may be based on a second MCS that is relatively higher or lower order than the first MCS.

The first MCS may correspond to one or more of a first bit or symbol rate, a first code rate and/or first code type such as used in forward error correction (FEC) or error correction code (ECC) coding, a first modulation (e.g., a first constellation whose constellation points are mapped based on first symbol labels), etc. and a second MCS may correspond to one or more of a second bit or symbol rate, a second code rate and/or second code type (e.g., FEC or ECC coding), a second modulation (e.g., a constellation whose constellation points are mapped based on symbol labels), etc. Considering an example of such operation, a first MCS may correspond to one or more of a bit rate of X bits per second (where X is some desired number), turbo coding using a code rate of Y (where Y is some desired code rate), 16 quadrature amplitude modulation (QAM), etc. and a second MCS may correspond to one or more of a bit rate of A bits per second (where A is some desired number greater than or less than X), low density parity check (LDPC) coding using a code rate of B (where B is some desired code rate greater than or less than Y), 32 amplitude phase shift keying (APSK), etc. Various examples of some types of FEC or ECC coding include repetition, rateless/rate-independent, Reed-Solomon (RS), convolutional, turbo, turbo trellis coded modulation (TTCM), low density parity check (LDPC), BCH (Bose and Ray-Chaudhuri, and Hocquenghem), etc. Various examples of modulations include binary phase shift keying (BPSK), quadrature amplitude modulation (QAM)/quadrature phase shift keying (QPSK), QAM of higher orders such as 16 QAM, 64 QAM, etc., various forms of phase shift keying (PSK) such as 8-PSK, various forms of amplitude phase shift keying (APSK), etc. Generally, communications for each of the first and second communication links may be supported using different operational parameters.

Figure 5:
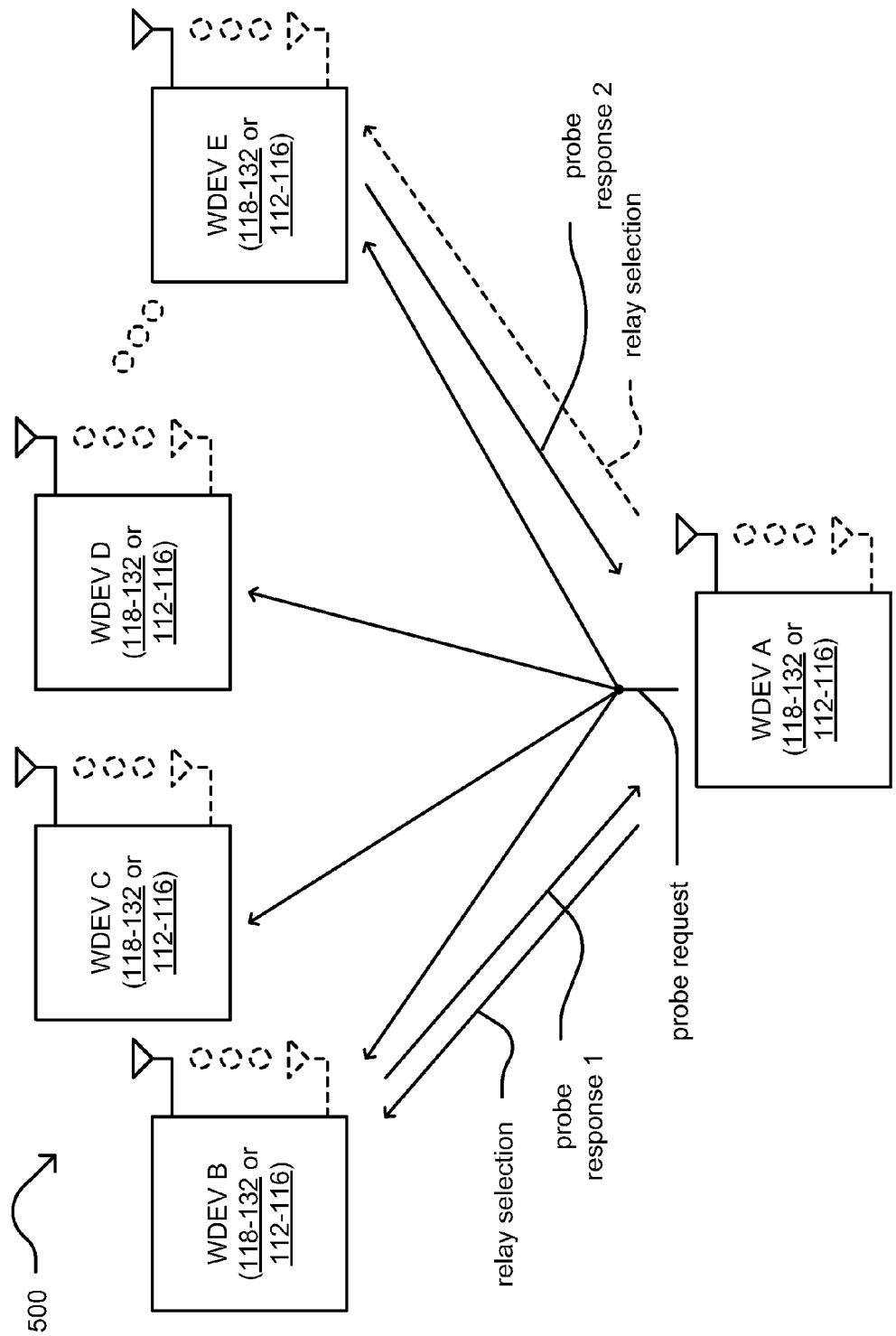
FIG. 5 is a diagram illustrating an example of selection of a relay wireless communication device from a number of wireless communication devices.

FIG. 5 is a diagram illustrating an example 500 of selection of a relay wireless communication device from a number of wireless communication devices. The wireless communication devices in this diagram may be any one of the devices 118-132 and 112-116 as described with reference to FIG. 1. A device "A" transmits a probe request that may be received by more than one potential relay device, shown as devices "B", "C", "D", and so on up to "E". The device A then receives probe responses from two or more of those potential relay devices. In one example of operation, the device "A" receives a first probe response from the device "B" and a second probe response from the device "E". The device "A" then selects either the device "B" or the device "E" to serve as a relay for communications between the device "A" and another device. The device "A" then transmits a relay selection signal to either of the device "B" or the device E, which ever one has been selected to serve as the relay. When probe responses are received from more than one potential relay device, the device "A" selects one of those devices to serve as the relay based on any one or more considerations. Examples of such considerations may include the potential relay device's prior service as a relay, being wall- or power-line-powered, the currently available processing resources, historical processing history, currently ongoing communications, historical communication history, etc.

FIG. 6 is a diagram illustrating an embodiment 600 of a number of wireless communication devices, some operative as smart meter stations (SMSTAs). The SMSTA are implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices (e.g., from the SMSTAs to an AP).

A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may transmit such information to another wireless communication device (e.g., an access point (AP), another SMSTA, a wireless station (STA), or such an SMSTA or STA operating as an AP, etc.).

In an SMSTA environment, multiple respective wireless communication devices (e.g., SMSTAs) can be implemented to forward monitoring and/or sensing related information to one particular wireless communication device that operates as a manager, coordinator, etc. such as may be implemented by an access point (AP) or a wireless station (STA) operating as an AP. Such SMSTAs may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes. Communications from SMSTAs may be very important and yet performed quite infrequently.

Currently developing protocols/standards adapted for such metering applications are intended for long range and low rate applications operating in the worldwide spectrum below 1 GHz. The available spectrum in each country differs and requires flexible design to accommodate different options, and such long range and low rate applications are designed to accommodate longer delay spreads which can be associated with lower data rate applications.

Considering an example of operation, a remotely located SMSTA may be unable to support communications with manager/coordinator device for any a number of reasons. For example, something such as a fence may be obstructing communications between the remotely located SMSTA and the manager/coordinator device. In such an instance, a relay device (e.g., another SMSTA or STA) can serve to support communications between the remotely located SMSTA and the manager/coordinator device. In one example of operation, the relay device may receive a frame from the remotely located SMSTA (hop $V_1$), and the relay device operates as a relay to generate and transmit a relayed frame to the manager/coordinator device (hop $V_2$.). The relaying may alternatively be performed in the opposite direction.

FIG. 7A is a diagram illustrating an embodiment of a method 701 for execution by one or more wireless communication devices. The method 701 begins by receiving a probe request that includes a link budget requirement for supporting a communication between a first other and a second other wireless communication device, as shown in block 710. In response to the probe request, the wireless communication device operates by identifying first capabilities of a first communication link between the wireless communication device and the first other wireless communication device and also by identifying second capabilities of a second communication link between the wireless communication device and the second other wireless communication device, as shown in block 720.

When the first and second capabilities meet or exceed the link budget requirement and the wireless communication device has capacity to support the communication, the method 701 operates by generating a probe response that indicates eligibility of the wireless communication device to serve as a relay for the communication, as shown in decision block 730. The method 701 then operates by transmitting the probe response to at least one of the first and the second other wireless communication device, as shown in block 740.

Alternatively, when the first and second capabilities do not acceptably meet or exceed the link budget requirement and or the wireless communication device does not have capacity to support the communication, the method 701 terminates. The wireless communication device does not need to generate or transmit a probe response when either of any of the requisite conditions is not met.

FIG. 7B is a diagram illustrating another embodiment of a method 702 for execution by one or more wireless communication devices. The method 702 operates by transmitting a probe request to a number of wireless communication devices that may potentially serve as relays, as shown in block 711. The method 702 then continues by receiving probe responses from two or more of those wireless communication devices, as shown in block 721. The probe responses are received from those potential relay devices that have determine their eligibility to serve as a relay. Potential relay devices that do not have eligibility to serve as a relay do not transmit probe responses. The method 702 then operates by selecting one of the potential relay devices to serve as the relay for communications between two respective devices (e.g., a source device and the destination device), as shown in block 731. The method 702 then continues by transmitting one or more frames to the selected relay device for forwarding to a destination device, as shown in block 741.

The use of probe request for relay discovery has been described in this disclosure. Such link budget information may also be included in a path request (PREM) based on a given communication link's budget (e.g., between an AP and STA) to allow reduced response. A given wireless communication device (e.g., a STA or SMSTA, or even an AP) decides the requirements for relaying and may then send such information to a destination device when possible. A potential relay device then identifies the link quality of communication links between itself and source and destination devices, respectively. The potential relay device determines whether or not it may serve as a relay based on this information as well as the potential relay device's capacity to serve as the relay. If the potential relay device is eligible to serve as a relay, then the potential relay device responds to the probe request (e.g., responds to the device that transmitted the probe request).

It is noted that the various operations and functions described within various methods herein may be performed within a wireless communication device (e.g., such as by the processor 217 and communication interface 218, or the processor 227 and communication interface 222, as described with reference to FIG. 2 and/or other components therein). Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface configured to:
receive, via at least one wireless communication channel, a probe request that includes a link budget requirement for supporting a communication between a first other wireless communication device and a second other wireless communication device; and
transmit, via the at least one wireless communication channel, a probe response to at least one of the first other wireless communication device or the second other wireless communication device; and
a processor configured, in response to the probe request, to:
identify first capabilities of a first communication link between the wireless communication device and the first other wireless communication device;
identify second capabilities of a second communication link between the wireless communication device and the second other wireless communication device; and
when the first capabilities and the second capabilities meet or exceed the link budget requirement and the wireless communication device has capacity to support the communication, generate the probe response to indicate that the wireless communication device is eligible to serve as a relay for the communication.

2. The wireless communication device of claim 1, wherein the processor is further configured to:
identify the first capabilities by performing a first channel estimation on the first communication link; and
identify the second capabilities by performing a second channel estimation on the second communication link.

3. The wireless communication device of claim 1, wherein the processor is further configured to determine the capacity of the wireless communication device based on at least one of currently available processing resources, historical processing history, currently ongoing communications, historical communication history, or prior relay service of the wireless communication device.

4. The wireless communication device of claim 1 further comprising:
the communication interface further configured to receive a relay selection signal from the at least one of the first other wireless communication device or second other wireless communication devices; and
the processor further configured, in response to the relay selection signal, to facilitate the communication between the first other wireless communication device and the second other wireless communication device via the first and second communication links.

5. The wireless communication device of claim 4, wherein the wireless communication device is further configured to receive a first communication based on a first modulation coding set (MCS) from the first other wireless communication device and to transmit a second communication to the second other wireless communication device based on a second MCS of relatively higher or lower order than the first MCS.

6. The wireless communication device of claim 1 further comprising:
a wall or power line powered wireless station (STA) or a wall or power line powered smart meter station (SM-STA) that operates based on sensed or monitored information, wherein the first other wireless communication device is a battery-powered STA or a battery-powered SMSTA.

7. The wireless communication device of claim 1 further comprising:
a first wireless station (STA) or smart meter station (SM-STA) that operates based on sensed or monitored information, wherein the first other wireless communication device is a second STA or SMSTA, the second other wireless communication device is an access point (AP), and the first STA or SMSTA is located outside of a service coverage area of the AP.

8. The wireless communication device of claim 1 further comprising:
a wireless station (STA) or a smart meter station (SMSTA) that operates based on sensed or monitored information, wherein the first other wireless communication device is another wireless station (STA) or another smart meter station (SMSTA) and the second other wireless communication device is an access point (AP).

9. A wireless communication device comprising:
a communication interface; and
a processor, at least one of the processor or the communication interface is configured to:
transmit, via at least one wireless communication channel, a probe request that includes a link budget requirement regarding functioning as a relay to a plurality of other wireless communication devices;

receive, via the at least one wireless communication channel, a first probe response from a first other wireless communication device of the plurality of other wireless communication devices that indicates eligibility of the first other wireless communication device to function as the relay and also indicates first capacity of the first other wireless communication device to support function as the relay using a first communication link between the first other wireless communication device and the wireless communication device and a second communication link between the first other wireless communication device and a destination wireless communication device that each have capabilities that meet or exceed the link budget requirement;

receive, via the at least one wireless communication channel, a second probe response from a second other wireless communication device of the plurality of other wireless communication devices that indicates eligibility of the second other wireless communication device to function as the relay and also indicates second capacity of the second other wireless communication device to support function as the relay using a third communication link between the second other wireless communication device and the wireless communication device and a fourth communication link between the second other wireless communication device and the destination wireless communication device that each also have capabilities that meet or exceed the link budget requirement;

select the second other wireless communication device or the second other wireless communication device to serve as the relay based on the first probe response and the second probe response; and transmit, via the at least one wireless communication channel, at least one frame to the second other wireless communication device or the second other wireless communication device that is selected as the relay for forwarding on to a destination wireless communication device.

10. The wireless communication device of claim 9, wherein:
the first capacity is based on at least one of currently available processing resources, historical processing history, currently ongoing communications, historical communication history, or prior relay service of the first other wireless communication device; and
the second capacity is based on at least one of currently available processing resources, historical processing history, currently ongoing communications, historical communication history, or prior relay service of the of the second other wireless communication device.

11. The wireless communication device of claim 9, wherein the at least one of the processor or the communication interface is further configured to:
transmit a first communication to the relay based on a first modulation coding set (MCS), wherein the relay is further configured to transmit a second communication to the destination wireless communication device based on a second MCS of relatively higher or lower order than the first MCS.

12. The wireless communication device of claim 9 further comprising:
a battery-powered wireless station (STA) or a battery-powered smart meter station (SMSTA) that operates based on sensed or monitored information, wherein the relay is a wall or power line powered STA or a wall or power line powered SMSTA.

13. The wireless communication device of claim 9 further comprising:
a wireless station (STA) or a smart meter station (SMSTA) that operates based on sensed or monitored information, wherein the relay is another STA or SMSTA and the destination wireless communication device is an access point (AP).

14. A method for execution by a wireless communication device, the method comprising:
receiving a probe request that includes a link budget requirement for supporting a communication between a first other and a second other wireless communication device;
in response to the probe request:
identifying first capabilities of a first communication link between the wireless communication device and the first other wireless communication device;
identifying second capabilities of a second communication link between the wireless communication device and the second other wireless communication device; and
when the first capabilities and the second capabilities meet the link budget requirement and the wireless communication device has capacity to support the communication, generating a probe response to indicate that the wireless communication device is eligible to serve as a relay for the communication; and
transmitting the probe response to at least one of the first other wireless communication device or the second other wireless communication device.

15. The method of claim 14 further comprising:
identify the first capabilities by performing a first channel estimation on the first communication link; and
identify the second capabilities by performing a second channel estimation on the second communication link.

16. The method of claim 14 further comprising:
determining the capacity of the wireless communication device based on at least one of currently available processing resources, historical processing history, currently ongoing communications, historical communication history, or prior relay service of the wireless communication device.

17. The method of claim 14 further comprising:
receiving a relay selection signal from the at least one of the first other wireless communication device or and second other wireless communication devices; and
in response to the relay selection signal, facilitating the communication between the first and second other wireless communication devices via the first and second communication links.

18. The method of claim 17 further comprising:
receiving a first communication based on a first modulation coding set (MCS) from the first other wireless communication device; and
transmitting a second communication to the second other wireless communication device based on a second MCS of relatively higher or lower order than the first MCS.

19. The method of claim 14, wherein the wireless communication device is a wall or power line powered wireless station (STA) or a wall or power line powered smart meter station (SMSTA) that operates based on sensed or monitored information, and the first other wireless communication device is a battery-powered STA or a battery-powered SMSTA.

20. The method of claim 14, wherein the wireless communication device is a first wireless station (STA) or smart meter station (SMSTA) that operates based on sensed or monitored information, the first other wireless communication device is a second STA or SMSTA, the second other wireless communication device is an access point (AP), and the first STA or SMSTA is located outside of a service coverage area of the AP.

* * * * *